United States Patent

Small

[15] 3,646,657
[45] Mar. 7, 1972

[54] APPARATUS AND PROCESS FOR FORMING TUBULAR BODIES

[72] Inventor: Bernard J. Small, 8343 South Winchester Avenue, Chicago, Ill. 60620

[22] Filed: Aug. 8, 1969

[21] Appl. No.: 848,512

[52] U.S. Cl. .................................29/200, 29/157, 113/1
[51] Int. Cl. ................................B23p 19/00, B21d 53/00
[58] Field of Search..............29/200 R, 200 A, 200 B, 200 D, 29/200 J, 200 P, 200, 208, 430, 211, 431, 234, 473.9, 235, 474.1, 157, 460; 113/1, 54, 1 E, 1 G

[56] References Cited

UNITED STATES PATENTS

| | | | |
|---|---|---|---|
| 2,187,431 | 1/1940 | Powell | 29/157 |
| 2,264,524 | 12/1941 | Hale | 29/157 |
| 2,344,460 | 3/1944 | Hermani | 113/1 |
| 2,405,544 | 8/1946 | Anjeskey | 29/200 |
| 2,558,576 | 6/1951 | Miller et al. | 113/1 |
| 2,805,635 | 9/1957 | Hale | 113/1 |
| 3,248,791 | 5/1966 | Powers | 29/460 |
| 3,465,568 | 9/1969 | Jonason | 29/157.3 |
| 3,545,062 | 12/1970 | Cox | 29/157.3 |

*Primary Examiner*—Harrison L. Hinson
*Attorney*—Charles B. Cannon

[57] ABSTRACT

An apparatus and process for the automatic fabrication of tubular bodies from an inner core and a blank of outer wrap material to envelop the core which is stationarily secured within the wrap and bounded by a pair of end caps. The process and the apparatus for carrying out the process includes cutting means for dimensioning the blank, flanging means for forming opposed side flanges on the blank, wrapper seamer means for wrapping with the blank a properly oriented inner core and seaming the flanged sides, second flanging means for flanging the ends of the tubular body and end cap mounting means and seamer means all of which operate in an automatic production line.

11 Claims, 32 Drawing Figures

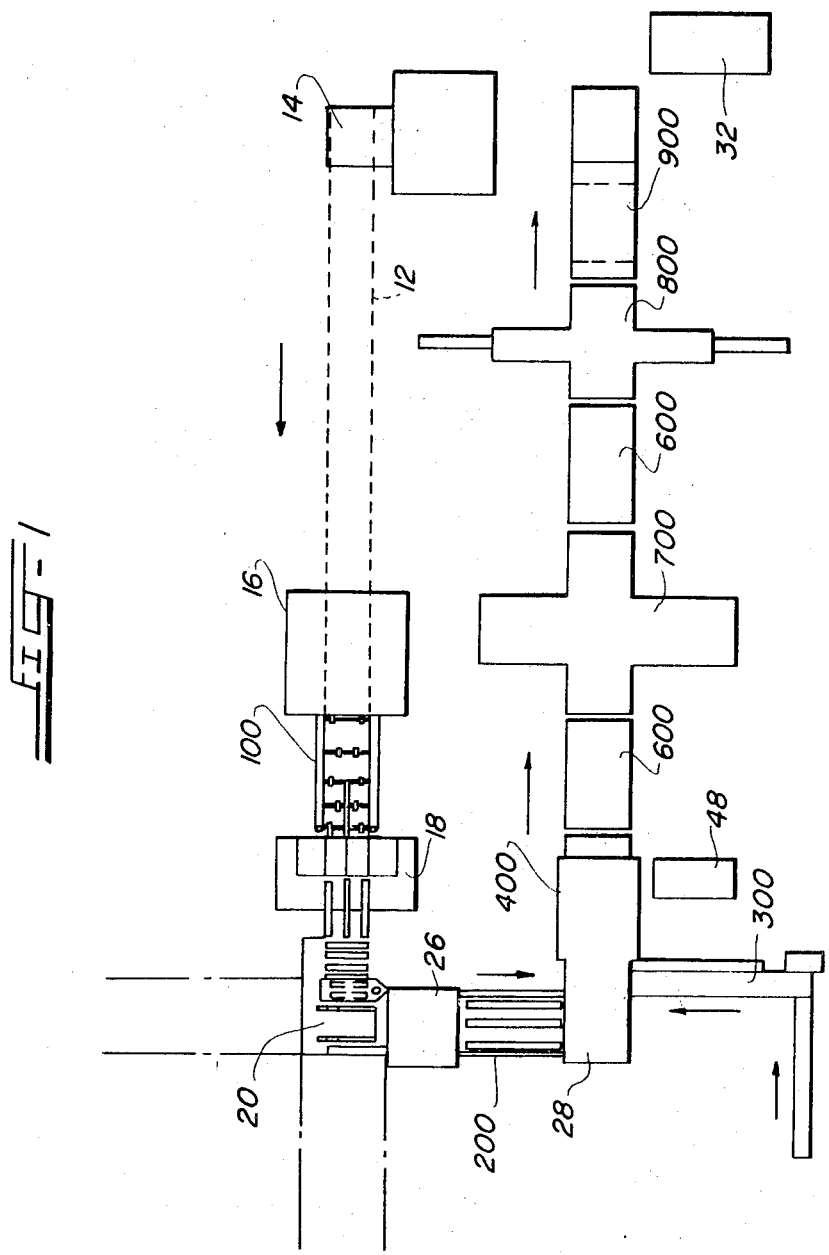

PATENTED MAR 7 1972 3,646,657
SHEET 02 OF 17

INVENTOR
BERNARD J. SMALL
BY Charles B. Cannon
ATTY

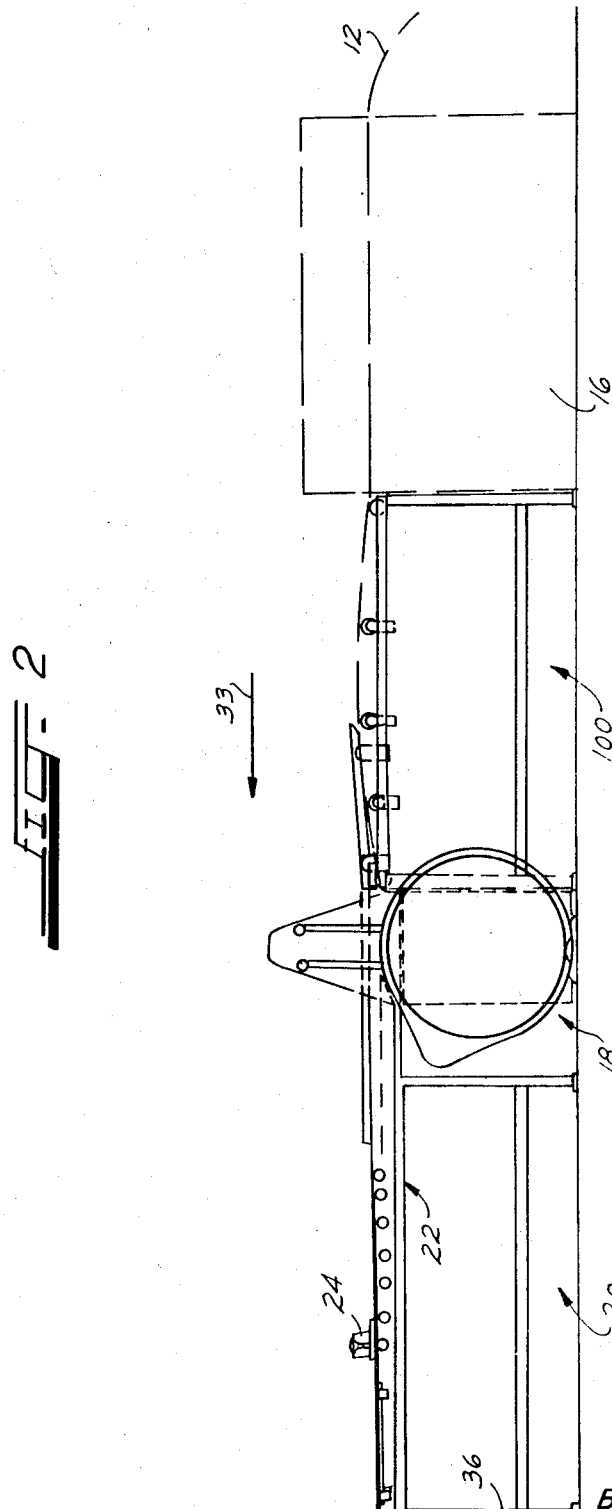

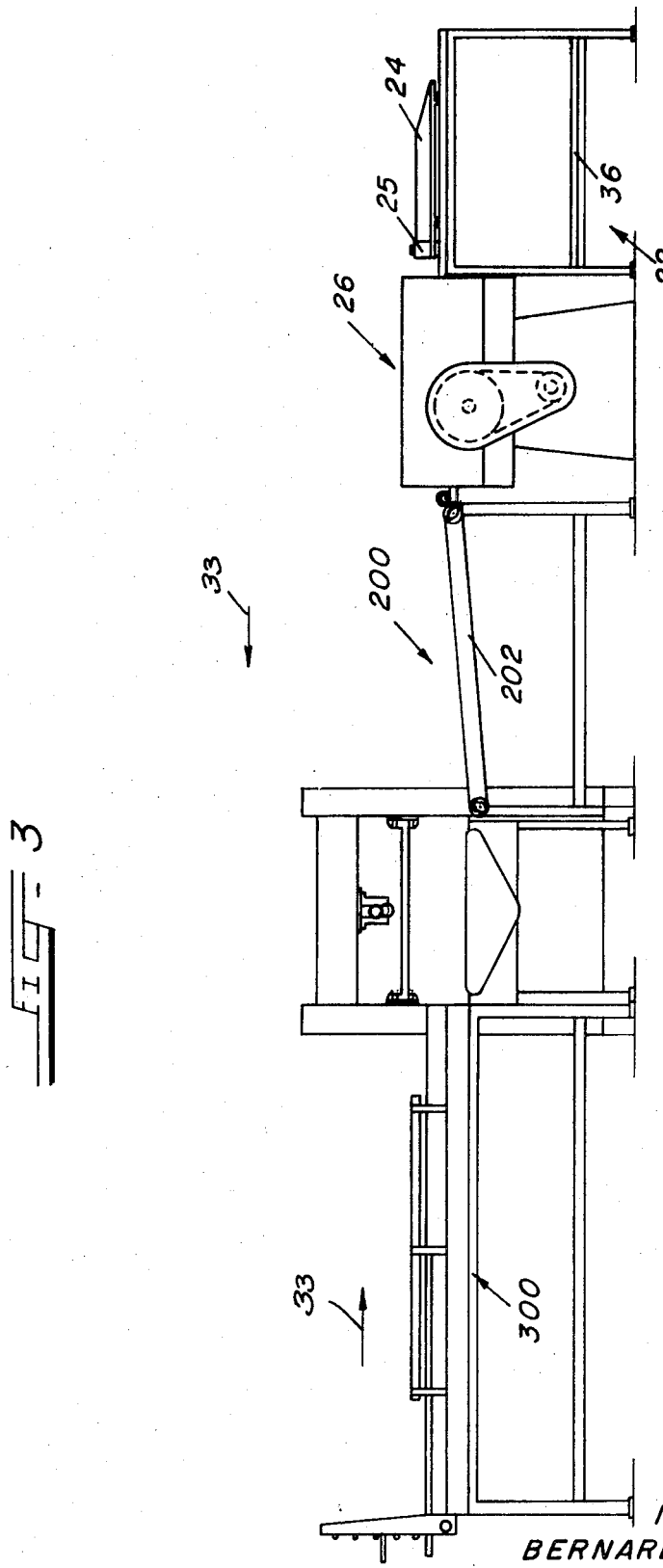

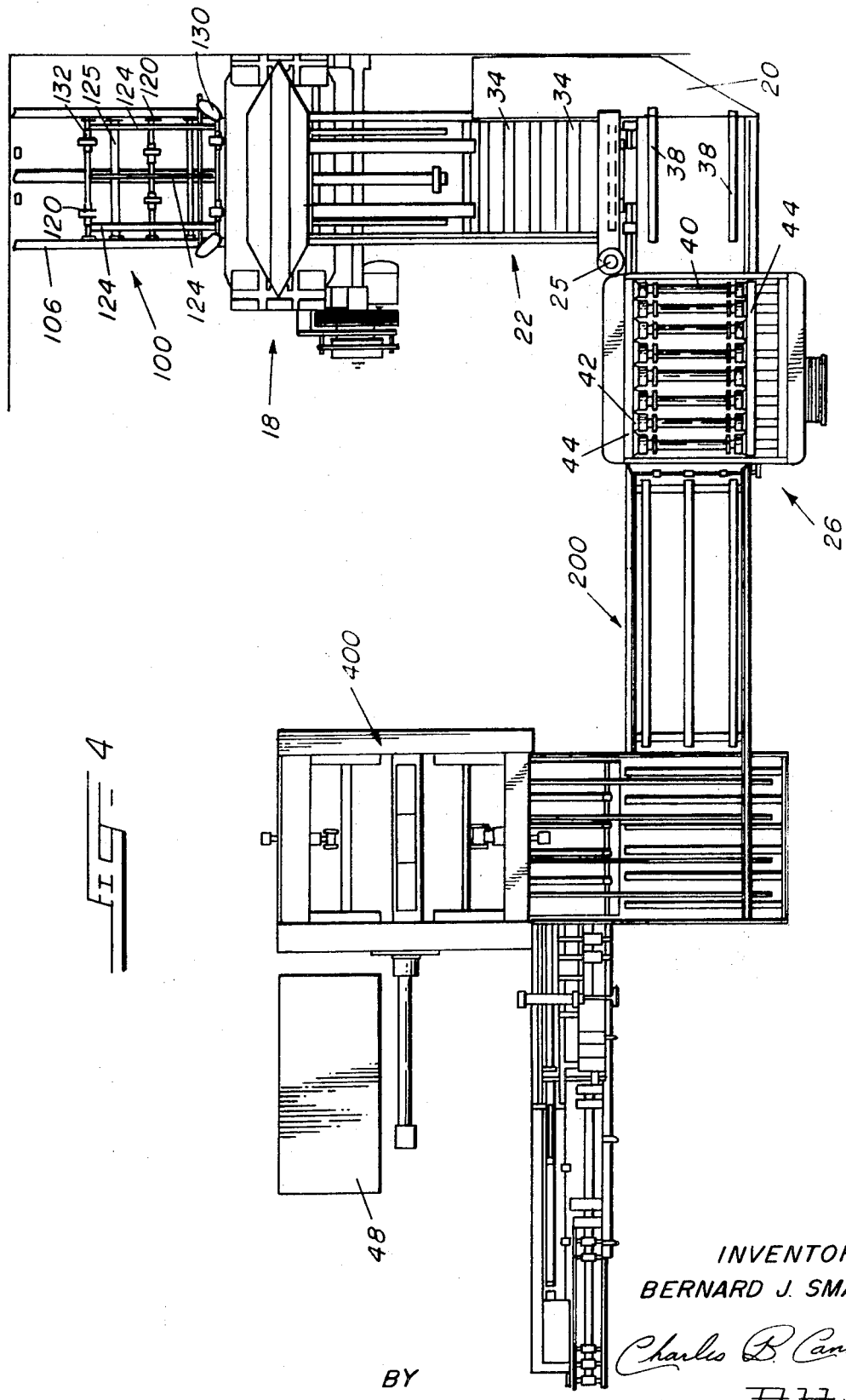

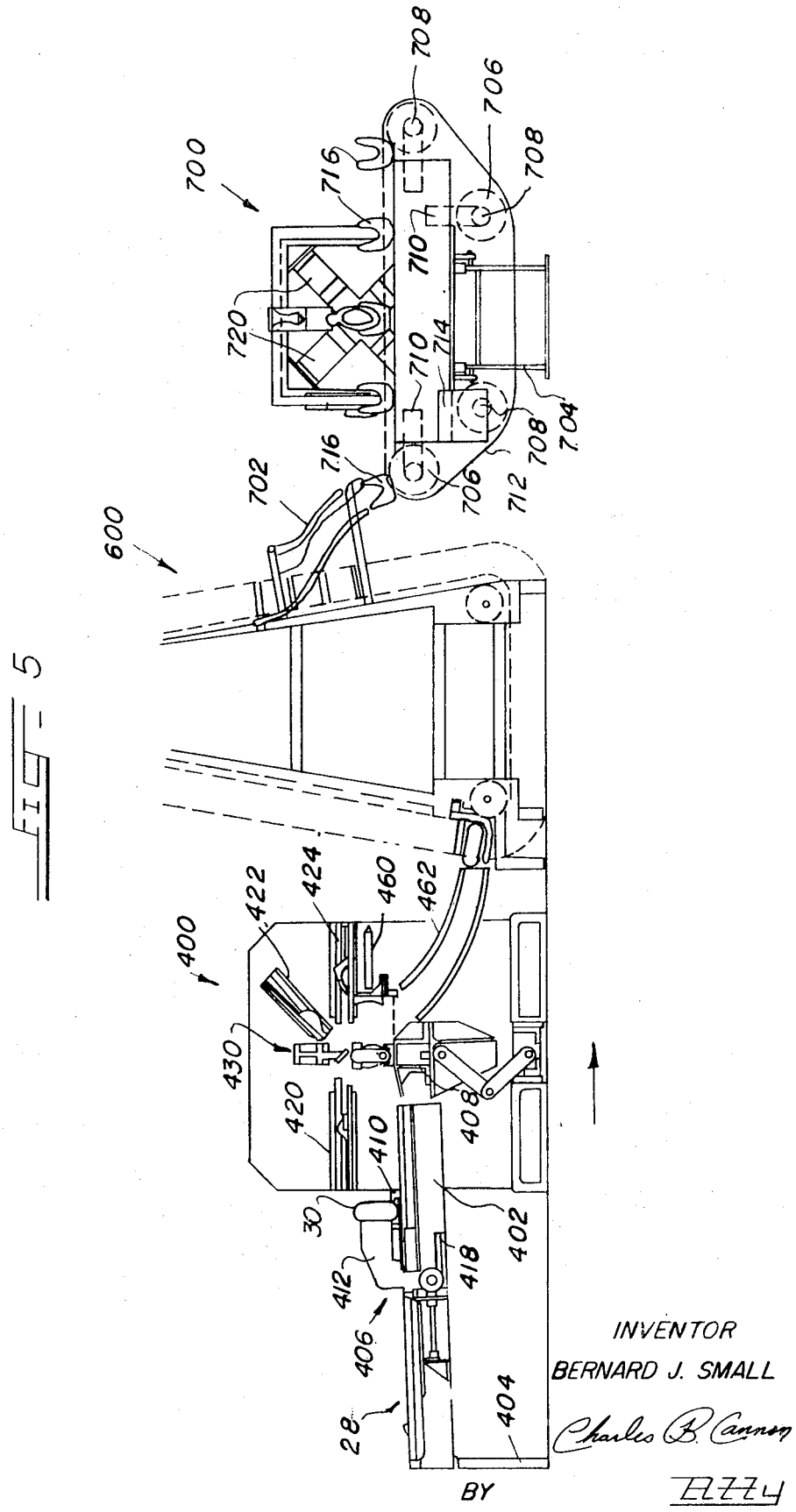

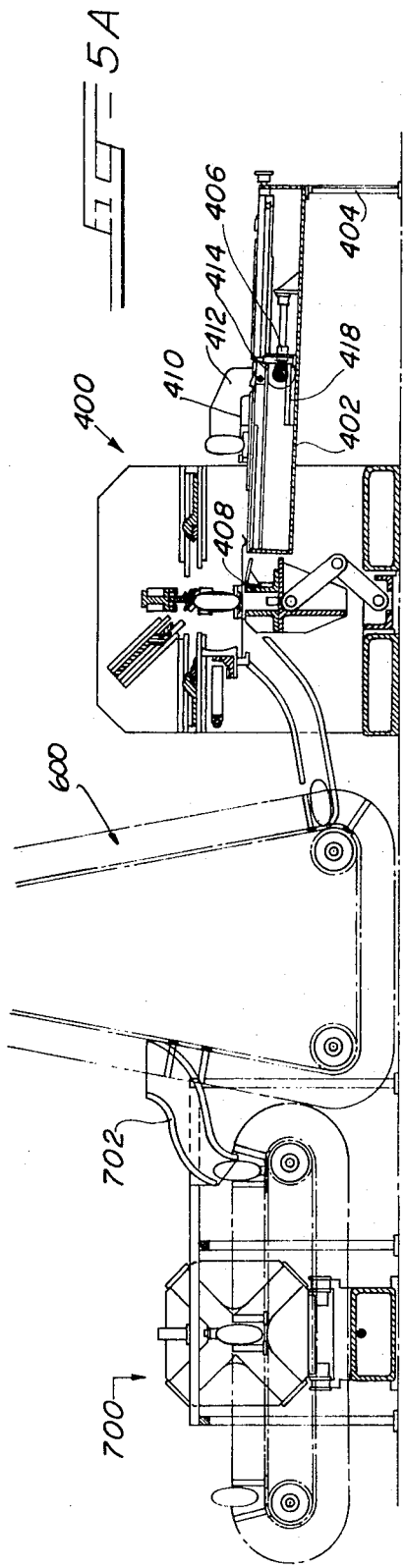
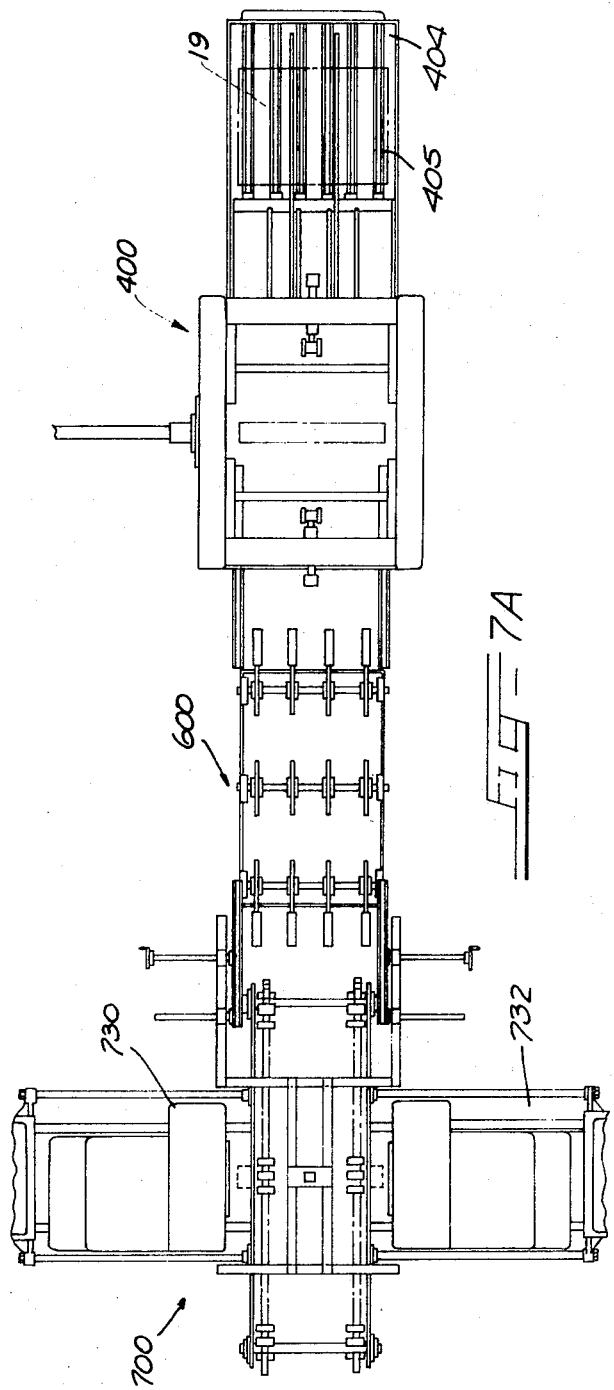

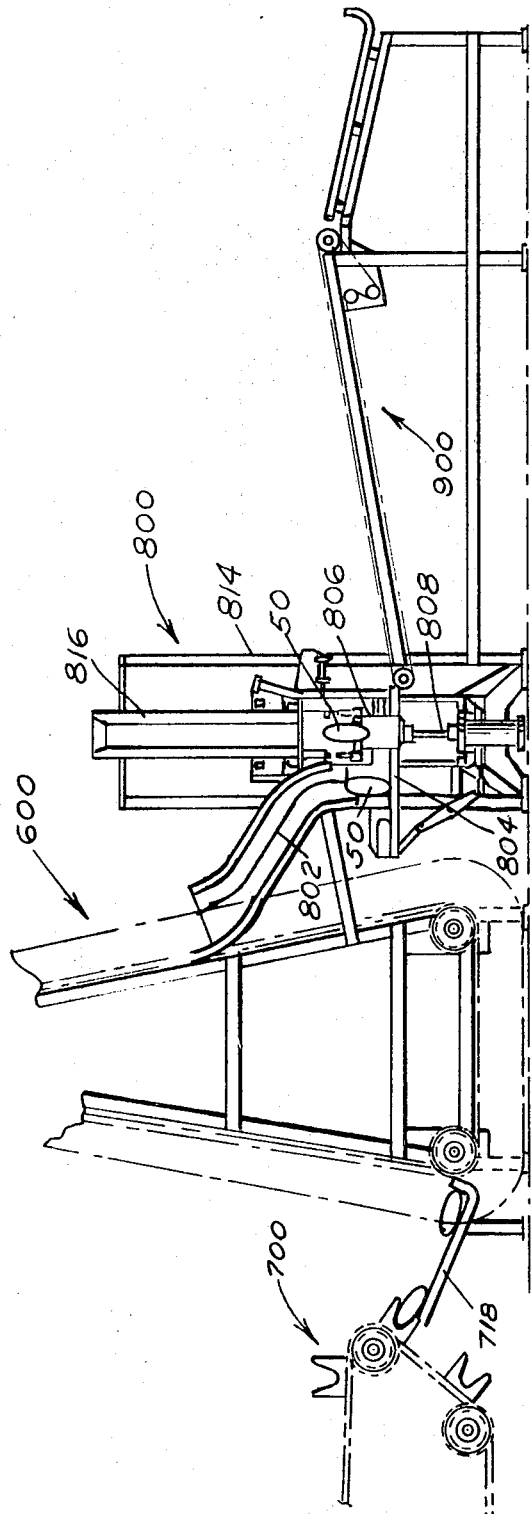

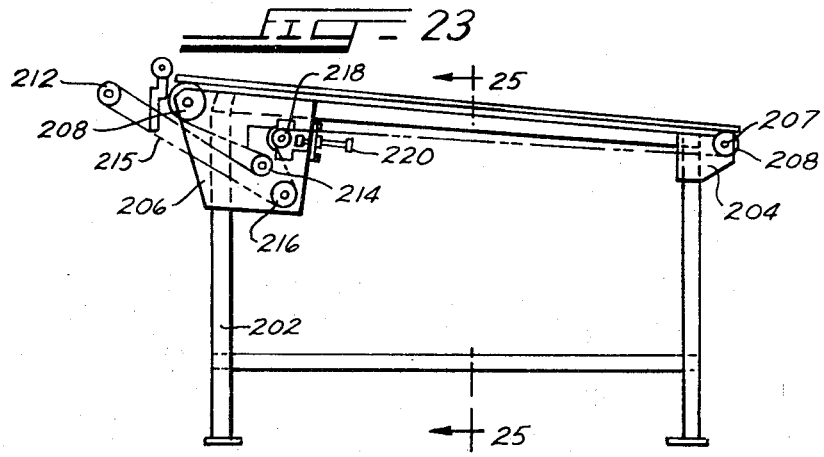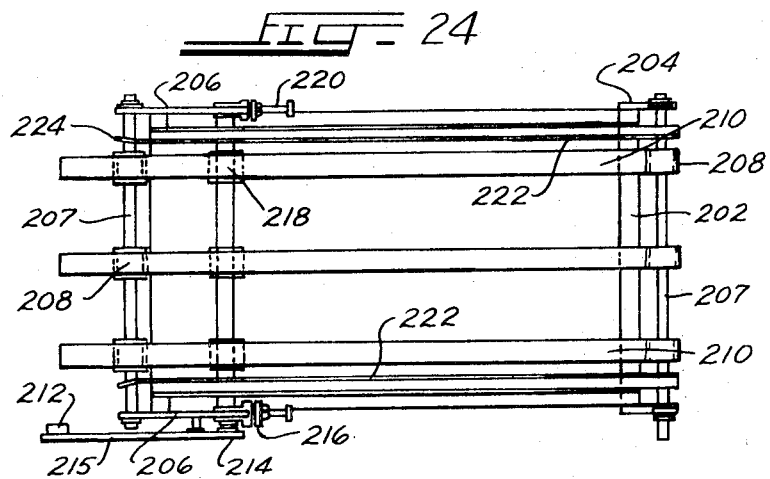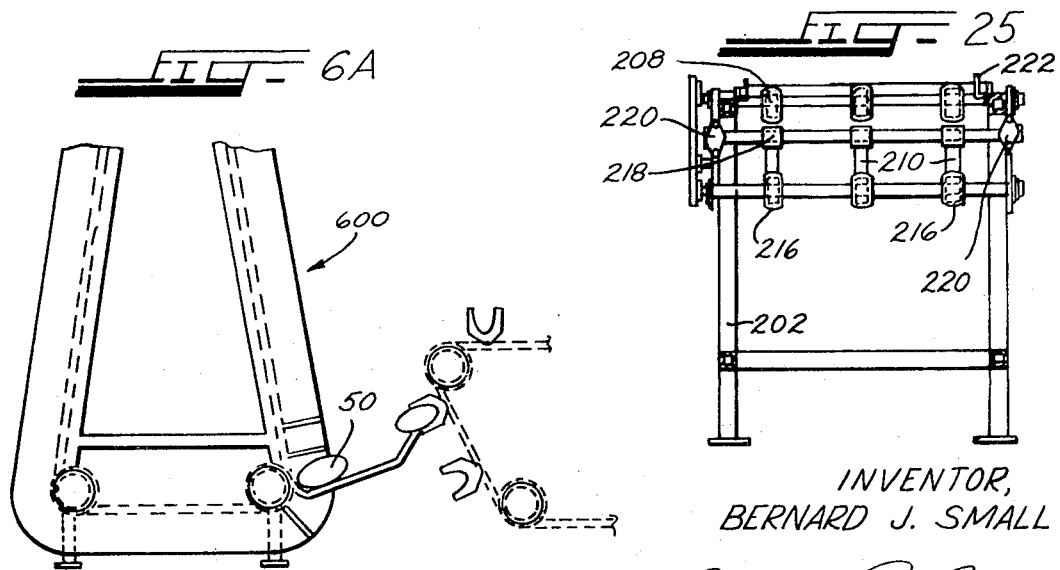

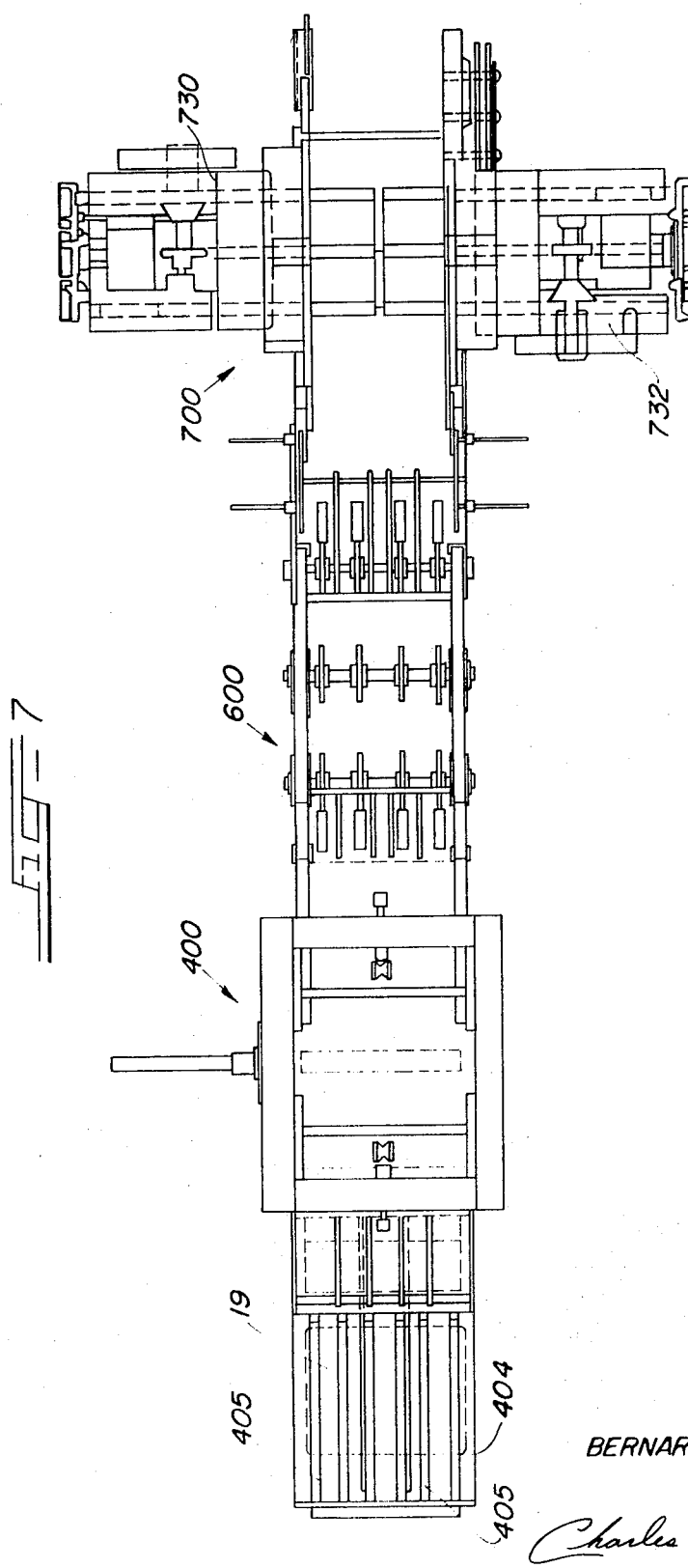

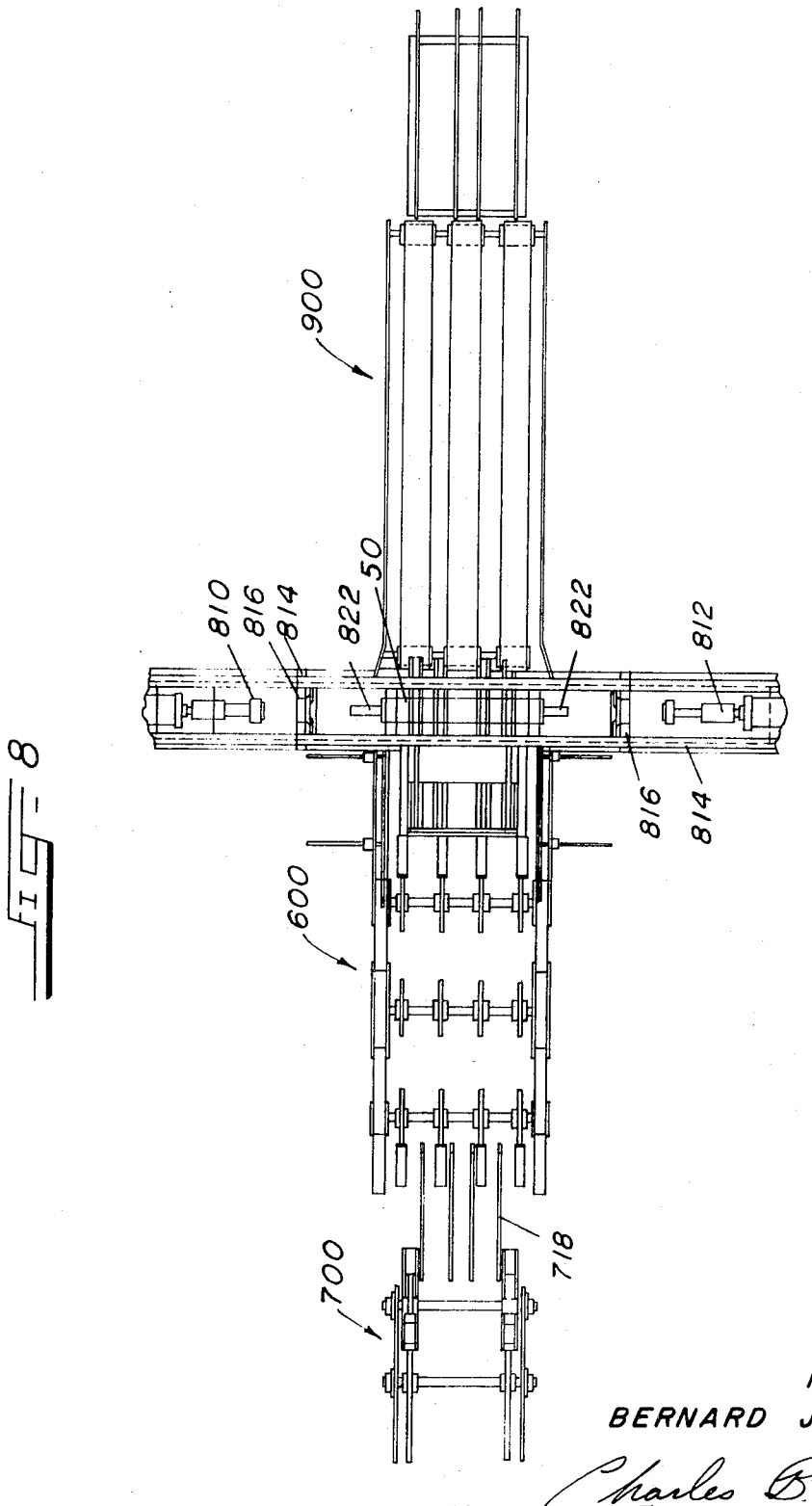

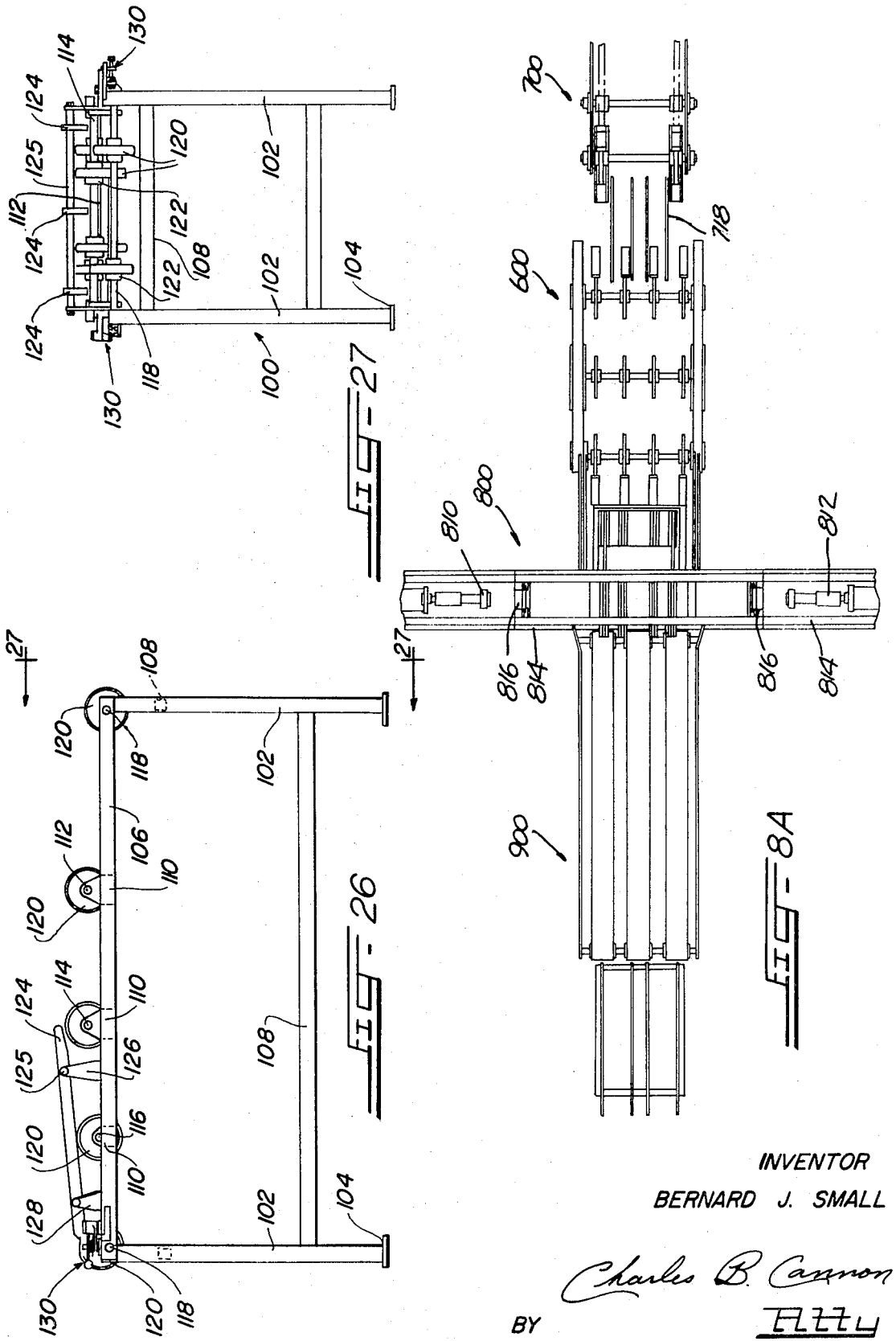

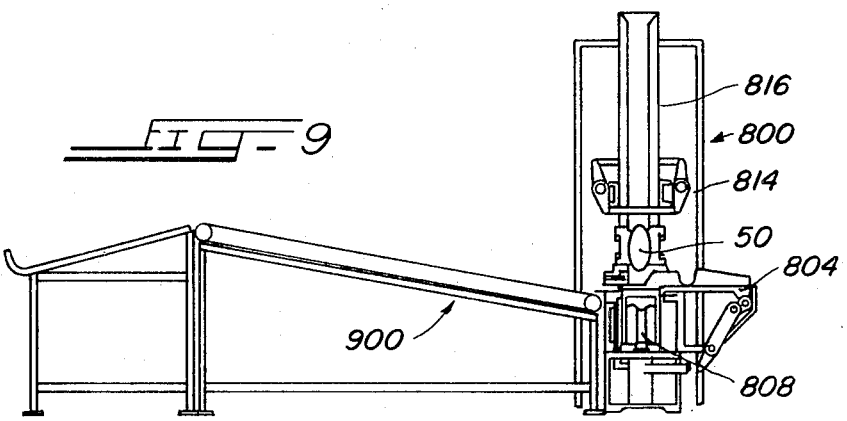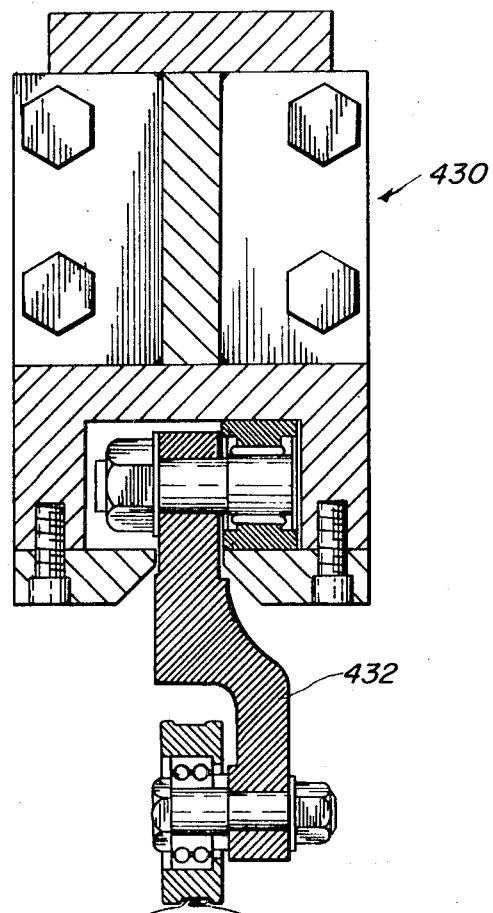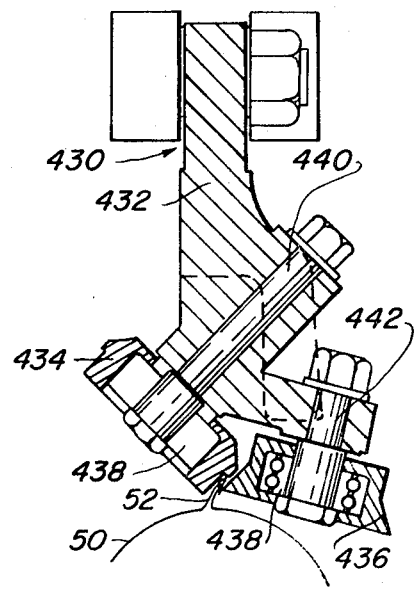

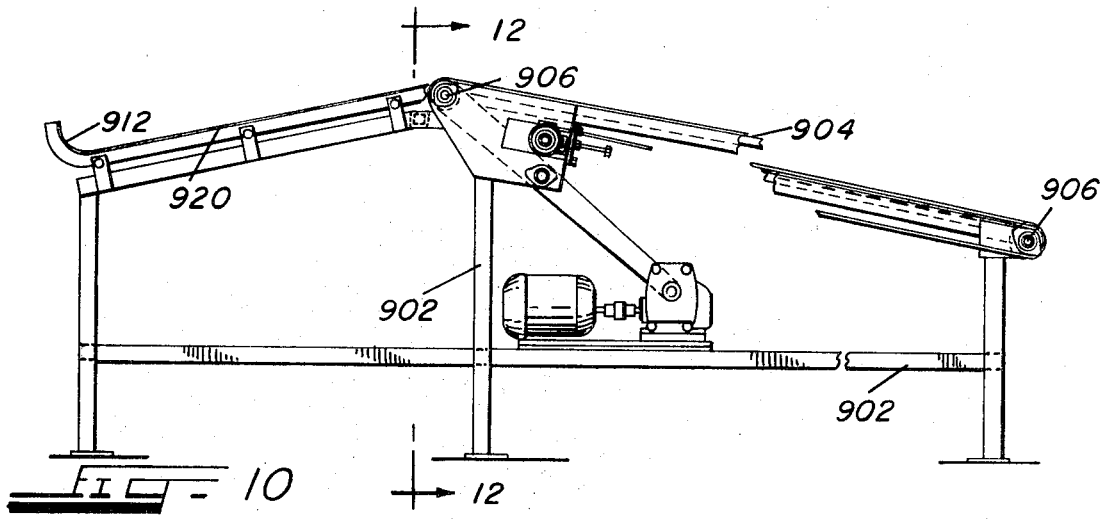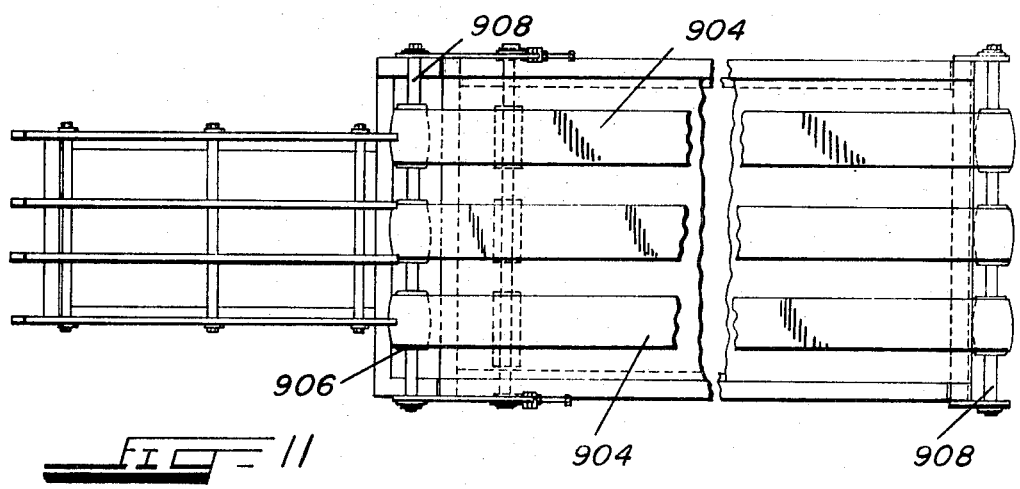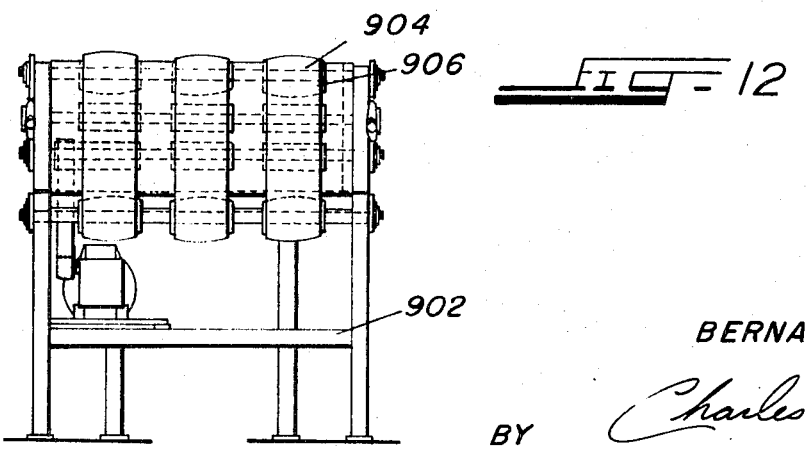

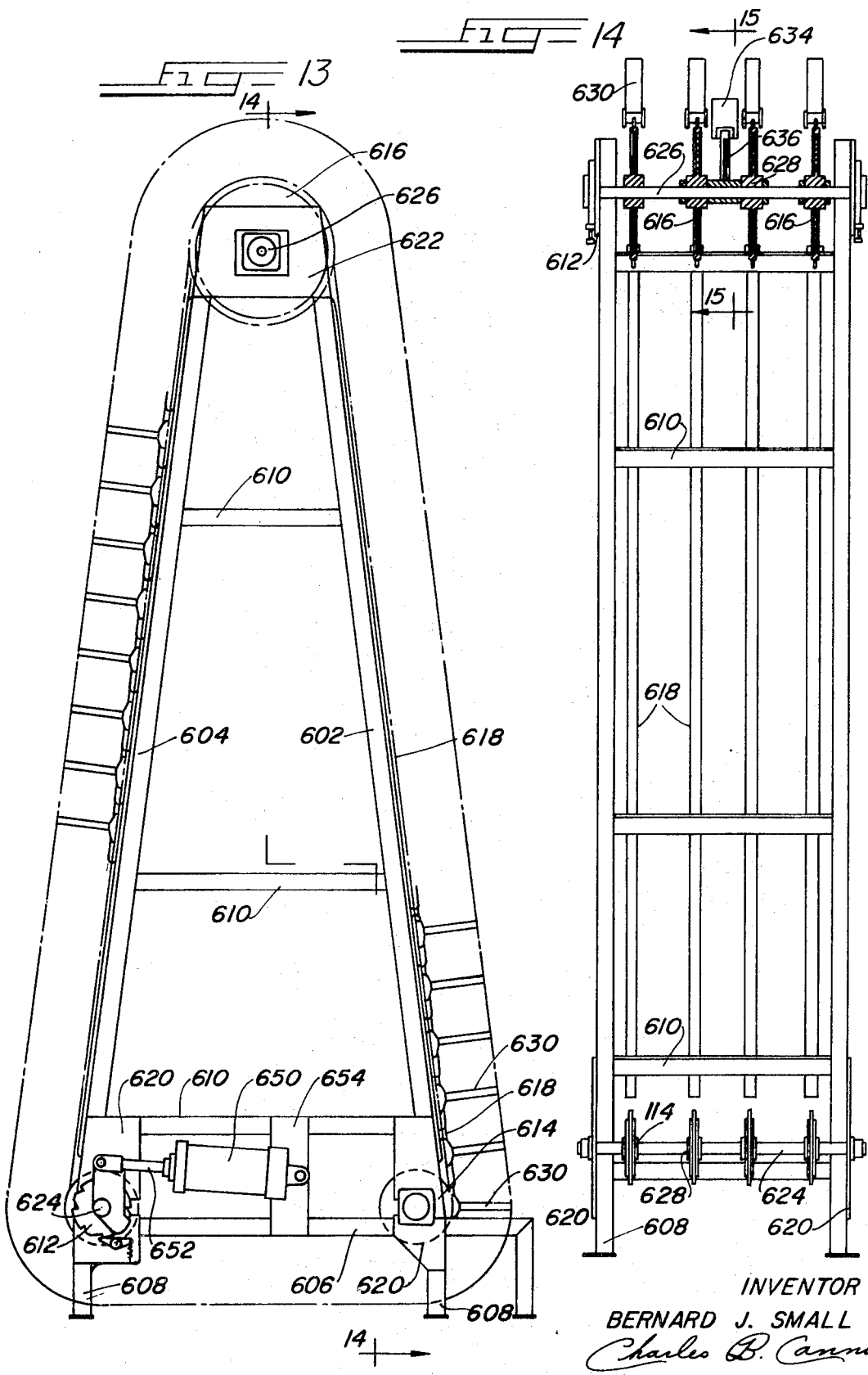

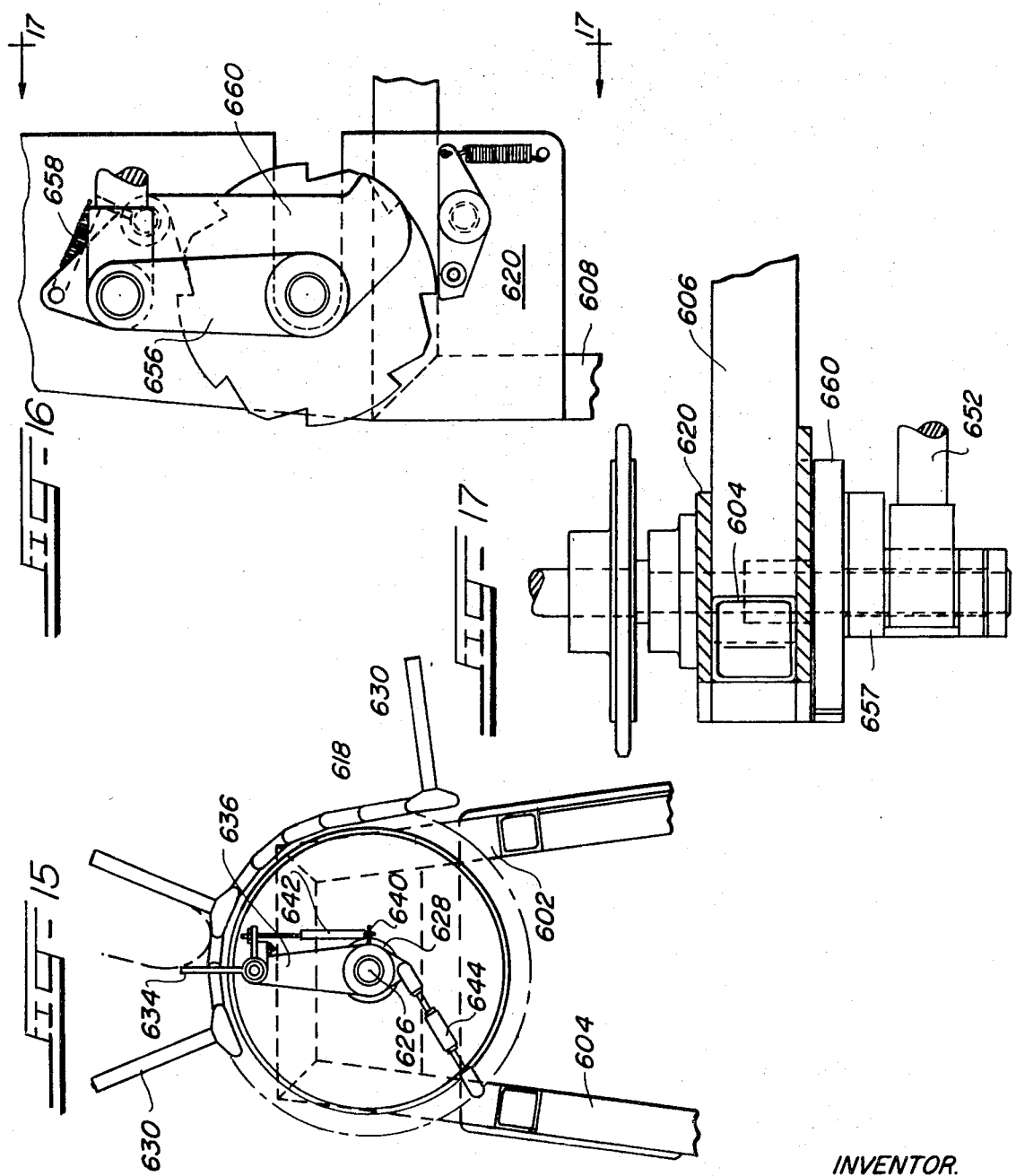

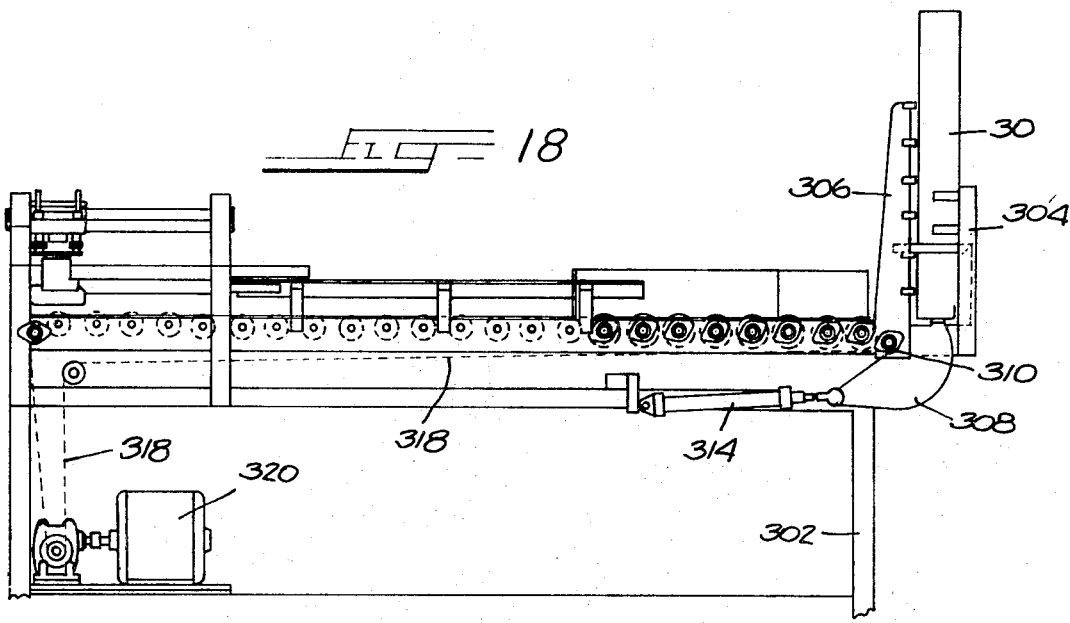
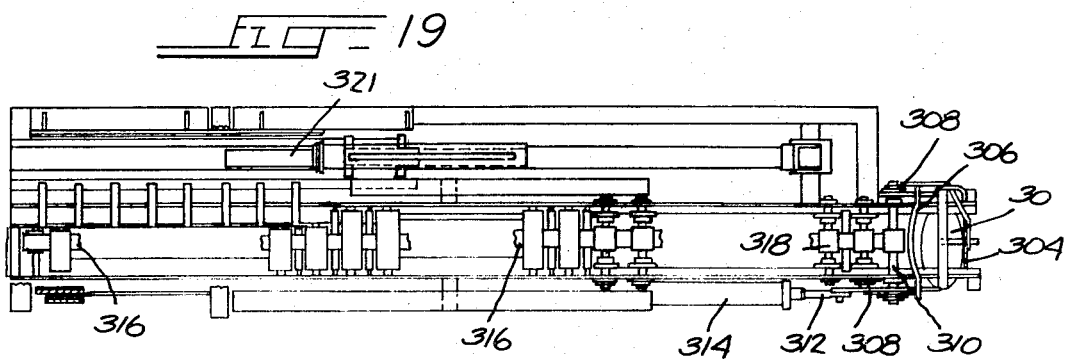
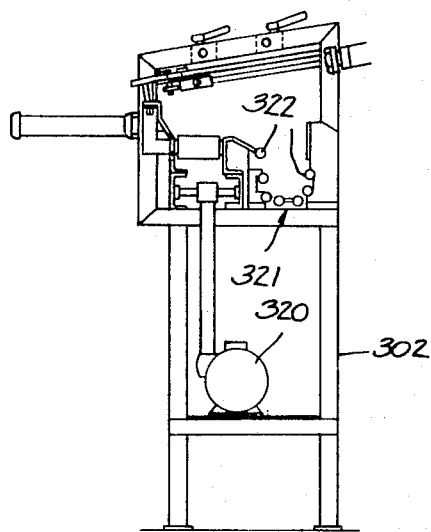

APPARATUS AND PROCESS FOR FORMING TUBULAR BODIES

The present invention relates to both an apparatus and process for the formation of enclosed bodies. More particularly the present invention relates to an apparatus and process for the continuous automatic fabrication of automotive mufflers from an inner core and a blank of wrap material which envelops the inner core which is stationarily secured within the wrap and bounded by a pair of end caps.

Heretofore the formation of automotive mufflers has been carried out on basically what might be considered a manual operation or a series of sequential manual operations during which the mufflers were assembled, seamed, and capped at a number of different operating stations by a number of machine operators.

While the muffler manufactured in this manner suffers in no way from an operational standpoint the thrust throughout not only the muffler industry but throughout most present day industries is toward greater or total mechanization. In this manner quality may be enhanced output may be increased to meet market demands.

However, although the thrust has been toward mechanization no system of muffler fabrication has, as yet, received acceptance throughout the industry.

The present invention, therefore, contemplates the provision of an assembly line system for the complete assembly of an automotive muffler during which and wherein the individual component parts are automatically assembled and formed together into a complete muffler.

One aspect of the invention contemplates an assembly system that broadly includes means to feed from coiled sheet stock a length of material for use as an outer wrap in the fabrication process. From the stock a predetermined length of material defining a section of material is cut upon demand of the system. Prior to cutting the sheet is cause to pass along a conveyor which functions to straighten or at least substantially relieves the tendency in the stock to bow and return to its previous coiled condition.

The section once cut and embossed as desired, is transported into a flanger unit within which a flange is applied along the full length of the uncut sides. The section to be flanged may, immediately prior thereto, have been cut from the stock or the section may be from stock and introduced to the system immediately prior to the stage. Irrespective of the source the feed of the section is automatically responsive to system demand.

The double flanged section is transported to the first assembly station. At a feed table for the assembly station, or the wrapper-seamer, a layer of asbestos, cut to proper size from a supply, is automatically or otherwise located on the section between the flanges. The asbestos provides a lining between the outer wrap and the oval inner muffler core later to be received at the feed table for movement with the lined section for assembly.

A second conveyor system driven in synchronism with the conveyed flanged sections is responsive to the presence of a lined sheet at the table entrance to a seamer and wrapper apparatus thereby to provide and orient a generally oval inner core in relation to the lined flanged section. The inner core is suitably separately supported above the lined flanged section after movement into the wrapper-seamer assembly so that upon movement of a ram the inner core may be wrapped. After wrapping, a seam is formed along the length of the muffler by the sequential movement of a plurality of knives which act on the side flanges thereby to form a lock seam.

The present invention contemplates that the seam may be formed to be parallel either axis of the core. Therefore, the inner core is suitably oriented for movement into the seamer with this thought in mind. In the present embodiment to be discussed in detail, however, the seam is to be formed adjacent the end of the major axis. However, if the inner core is circular or in some other accepted configuration other considerations are required.

The seam is formed by sequential movement of a plurality of knives located adjacent the flanges. These knives function to create, with proper flange movement, a lock seam that secures the inner core and forms with the outer wrap a tubular body.

The seamed unit is conveyed by an accumulator to a further stage of the system wherein a short lateral flange or bead is formed at both open ends of the tubular body. These flanges adapt the body for receipt of a pair of end caps thereby to form a completed unit.

A second accumulator, which func,ions in a fashion similar to the first accumulator, receives the end-flanged unit for transport to the cap assembly station. The end caps may be automatically fed from a pair of spaced magazines and frictionally received over the flange or bead to seal the interior core. As the inner core is provided with passages for communication with both the exhaust and tailpipes care is exercised to properly align the end caps on the tubular body. In this manner the exhaust and tailpipe may be properly mounted.

Final seaming of the end caps to the outer wrap completes the process to be discussed in greater detail hereinafter.

The invention also contemplates the provision of a novel accumulator conveyor which transports, upon controlled need of the system, mufflers in stages of completion between various assembly and operative stations of the overall system. The conveyor allows for the accumulation between stations of the partially completed mufflers to allow for an increase in the rate of production of the overall system to approximately 360 mufflers per hour. In this connection the conveyor path is significantly lengthened from the otherwise straight path between stations. Additionally, stock inventory may be introduced to the conveyor for delivery to following stations during periods of partial shutdown. Further still, the conveyor includes means whereby the seamed muffler, introduced to the conveyor in one position, may be reoriented during transit to a second position thereby to be properly aligned for further processing.

The invention also contemplates as a further aspect a novel end flanger for flanging simultaneously the opposite ends of the tubular body. In this connection the end flanger forms around the entire periphery of the tubular body a 90° flange so that the body may frictionally receive a pair of end caps to enclose the inner core.

In view of the foregoing brief consideration and the following more detailed discussion it will be apparent that the system is adaptable to varied needs and considerations and functions in a manner so as to carry out the objects and provide the benefits and advantages attributable thereto.

In carrying out the several objects the invention contemplates a method for automatically fabricating an automotive muffler comprising providing a blank of sheet material having predetermined dimensional characteristics, transporting said blank through the system in which opposed longitudinal sides of the blank are seamed after enwrapping as hereinafter defined inner core to form an open ended tubular member, transporting an inner core in synchronism with said transported blank and orienting said inner core with respect to said blank at said station to enable it to be wrapped, applying end capping elements to said tubular member for enclosing said inner core, and sealing said elements to said member.

The objects are further carried out by a system for the automatic fabrication of automotive mufflers, the combination comprising a blank of sheet material having predetermined dimensional characteristics; motive means for transporting said blank through said system including a wrapper and seamer unit for wrapping said blank around an hereinafter defined inner core and seaming the joined longitudinal edges of said blank to enclose said inner core and form a tubular member, a flanger unit for forming a flange around the periphery at the open ends of the member for receipt of a pair of end caps, and a seamer unit for securing said end caps at said open ends to enclosed said inner core; and second motive means responsive to movement of said first motive means for transporting said inner core in synchronism with the movement of said blank thereby to orient the inner core in relation to said blank to travel in consort therewith whereby said inner core is enwrapped in said blank and secured by said end caps within the aforementioned units.

Additional objects are carried out by the provision of an apparatus for use in a fabricating system comprising an endless conveyor connecting stages of the system and for conveying partially fabricated articles between said stages throughout an elongated passage which is greater than the distance between said stages, means for driving said conveyor in response to system demands and in synchronism to movement of said partially completed article through said system, means carried by said conveyor for supporting an article throughout movement in the elongated passage between an article inlet and an article outlet, said support means being mounted by the conveyor in a manner such that upon movement of the conveyor said support means is positioned to receive said article from an immediately preceding stage, means in said conveyor path for reorienting the received article from a n inlet position to a second position, and outlet means for passing said reoriented article to a following stage of said system.

There have thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several aspects of the invention. It is important, therefore, that the claims be regarded as including such equivalent constructions as do not depart from the spirit and scope of the invention.

A specific application of the invention has been chosen for purpose of illustration and description, and is shown in the accompanying drawings forming a part of the specification, wherein:

FIG. 1 is a schematic block diagram of the operational stages included in the fabrication process;

FIG. 2 is a side elevation of a portion of the system of FIG. 1;

FIG. 3 is a side elevation of an additional portion of the system of FIG. 1;

FIG. 4 is a top plan view of the structure as shown in FIGS. 2 and 3;

FIG. 5 is a side elevation of an additional portion of the system of FIG. 1;

FIG. 5A is a view similar to FIG. 5 yet viewing the system from the opposite side;

FIG. 6 is a side elevation of a further position of the system of FIG. 1;

FIG. 6A is a view similar to FIG. 6 showing a portion of the structure from the opposite side;

FIG. 7 is a top plan view of the apparatus of FIG. 5;

FIG. 7A is a view similar to FIG. 7;

FIG. 8 is a top plan view of the apparatus of FIG. 6;

FIG. 8A is a view similar to FIG. 8;

FIG. 9 is a side elevation of the terminal apparatus of FIG. 6 from the opposite direction;

FIG. 10 is a partial side view of a portion of the structure of FIG. 9;

FIG. 11 is a top plan view of the structure of FIG. 10;

FIG. 12 is a vertical section as seen along the line 12—12 in FIG. 10;

FIG. 13 is a side elevation of the accumulator conveyor;

FIG. 14 is a vertical section as seen along the line 14—14 in FIG. 13;

FIG. 15 is a vertical section as seen along the line 15-15 in FIG. 14;

FIG. 16 is an enlarged view of the drive means for the accumulator conveyor;

FIG. 17 is a front elevation of the drive means as seen along the line 17–17 in FIG. 16;

FIG. 18 is a side elevation of the inner core member conveyor;

FIG. 19 is a top plan view of the conveyor of FIG. 18;

FIG. 20 is a front elevation of the conveyor of FIG. 18;

FIGS. 21 and 22 are views in cross section showing sequentially the rollers for folding the seam in the outer wrapping;

FIG. 23 is a side elevation of a sheet transport table;

FIG. 24 is a top plan view of the transport table of FIG. 23;

FIG. 25 is a vertical section as seen along the line 25—25 in FIG. 23;

FIG. 26 is a side elevation of the hump table; and

FIG. 27 is a front elevation of the table as seen in the direction of the line 27—27 in FIG. 26.

Figure 1A:
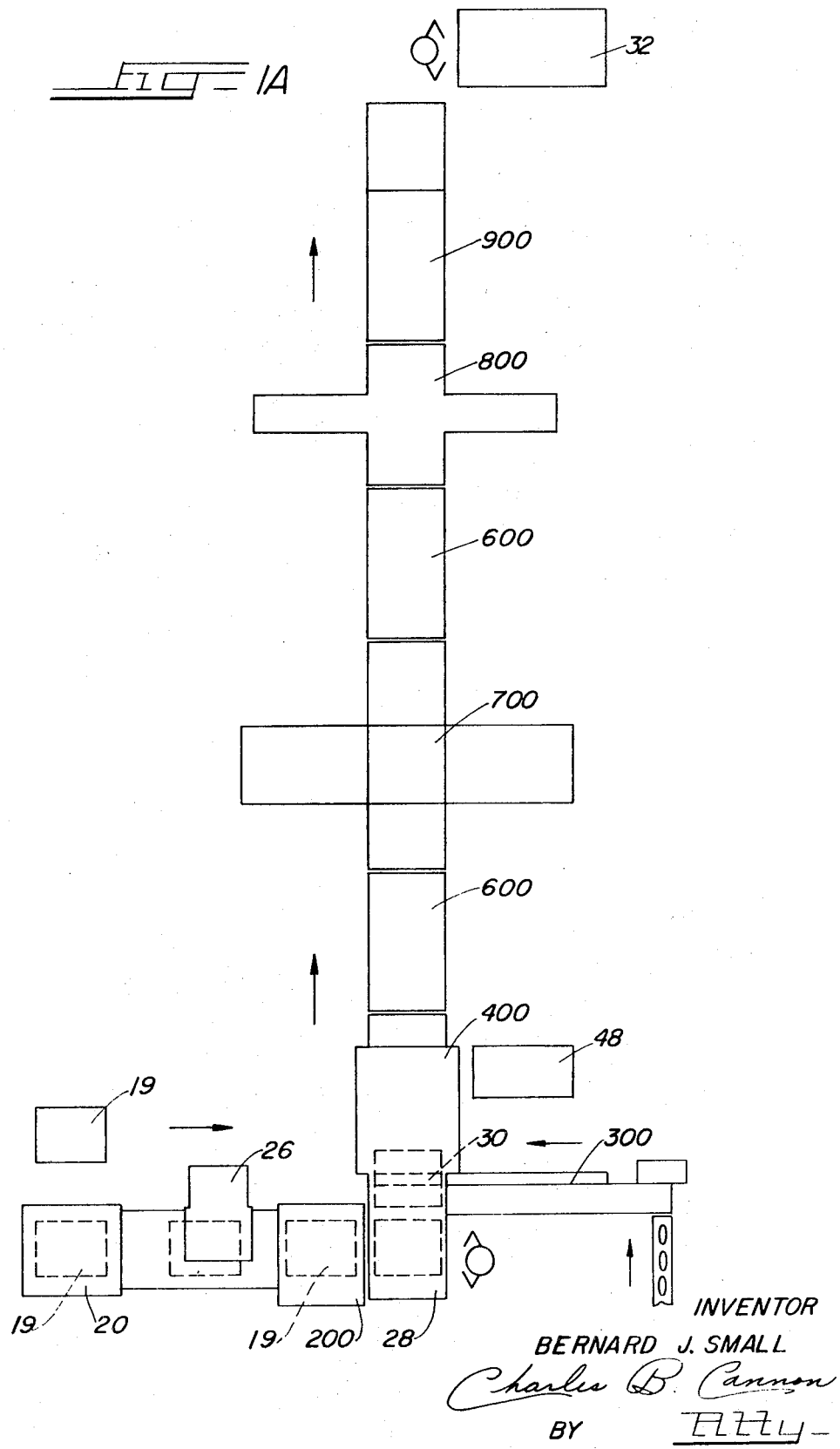
FIG. 1A is a schematic block diagram of the operational stages of a modified fabrication process.

The system and the processing stations for the fabrication of an automotive muffler may be seen in FIG. 1. The system generally includes a number of stations including operative apparatus and interconnecting conveyor means which, upon demand, delivers the structural components of the muffler for assembly.

The system includes a reeling apparatus 10 providing a coiled length of stock sheet material 12. The stock sheet material is unrolled from a reeling spindle 14 upon demand of the feeder 16 which, as later discussed, is primarily controlled by the wrapper-seamer unit. While not shown in the figure, the feeder includes a plurality of support rollers between spaced pairs of input and output rollers that are driven by a variable speed motor for fast start and stop motion. The feeder may develop a 15,000 lb. capacity in the uncoiling and feeding operation.

The sheet material is suitably of a width as determined by the size of the muffler to be formed and may be stock of any gauge. For the sake of discussion the sheet material may be 14-gauge and it may be, because of the implementation of nylon coated rollers, used at various stages, either plated or prepainted prior to introduction into the system to be described.

While not shown in the figures the sheet material may be supported during its travel from the uncoiler 10 to the feeder 16.

The feeder, in addition to drawing the sheet stock from the coiled roll, moves the stock toward a press 18 having once passed over a "hump table" 100. The table, discussed in greater detail hereinafter, provides an arcuate path of travel for the sheet thereby to introduce a reverse bend to aid in overcoming the tendency of the sheet to bow as a result of the previous coiled disposition.

The feed 16 provides drive for the sheet material toward the press 18. The press accurately notches and cuts the sheet material into elongated sections 19 of, for example, 10" to 32" in length. Sections of a length between these limits may be fabricated into mufflers, the sections serving as an outer wrap for a core that is delivered at a later stage. However, the system will, with adjustment, accept sections of greater length, for example, 40".

The press may be a positive pulldown press providing exact shear. Such a press, identified as an "SP Moon Press," manufactured and sold by Moon Brothers, Ltd. Birkenhead, England, may suitably be employed for this operation.

As desired, the individual cut sections may also be embossed with manufacturer's indicia during the cutting or in a subsequent operation.

The cut sections 19 exit the press onto a transport table 20 mounting a constantly driven conveyor including an endless belt and a plurality of supporting spindles, all generally represented by the numeral 22 (FIG. 2). A pivot arm 24 is also carried by the table and in response to system demands functions to swing the sheet sections through an angle of 90° for entry into the following station in the system. The sheets are driven by the conveyor square to the arm to proper alignment. The arm is magnetic and "hooks" the section for movement.

It is apparent that the system could be oriented so that the several operative stages follow one another longitudinally. In this connection, while the conveyor or transport table 20 would find usage, the need to redirect the traveling section would be unnecessary. Consequently there would be no need to incorporate an arm as described. However, space considerations often make it necessary to orient a line system wherein the components travel within a path, such as shown.

The assembly contemplates that sections from stock, i.e., sections that have previously been cut to the desired length, may be received at the transport table 20 for further processing. This feed path is indicated by the dotted lines in FIG. 1. This will permit, among other things, servicing of the previously described structure without any shutdown in the total operation. Introduction of stock is also possible within the accumulator conveyor stages, as will be described.

The sections 19, either from stock or directly from the press 18 are transported into a unit 26 capable of providing an upturned flange along the total length of each of the uncut sides of the sections. The side-flanger unit is capable of receiving sections of varied width and may form in addition to both single or double flanges, hems, a hem and flange combination, etc. The present system contemplates the use of a "Model IM," also manufactured by Moon Brothers, Ltd. The flanger does not, other than in the overall combination, form a part of the present invention and, therefore, will not be discussed in any greater detail. However, further reference may be had to their brochure identified "Silencer making machines, Edge forming machine, Model IM."

A conveyor apparatus 200, at the exit of the flanger 26, transports the section to a feed table 28 associated with the first assembly station of the system.

At the feed table, although not shown in the drawing figures, a section of asbestos configured thereby to be generally similar in size to the size of the section is automatically located thereon. The asbestos thereafter functions as a liner between the outer wrap of the muffler and the inner core 30 of the muffler which is conveyed to the feed table located relative to the lined section for assembly.

A conveyor line 300 conveys the inner core elements 30 of the muffler to the feed table 28 so that, individually, they move with a lined section 19 into a wrapper-seamer apparatus 400. The wrapper-seamer apparatus wraps the lined section 19 around the inner core 30 and by means of various sequential operations the side flanges are caused to intercooperate as a lock seam along the longitudinal length of the muffler. This operation, as well as the following operations will be described in greater detail below.

An accumulator conveyor 600 transports each wrapped and seamed muffler unit into a second flanger unit 700. The second flanger unit forms an outward flange at each end of the generally tubular body for receipt of a pair of end caps within a capping unit 800.

A second accumulator conveyor, similar to the first is located between the end flanger and the capping unit. Both conveyors function, not only to lengthen the transport path between operative stations thereby to accumulate inventory as an automatic feed off following the wrapper-seamer and flanger stage but also automatically feed back accumulated inventory for station backup to furnish individual units on demand. The accumulators also, to be described, uniquely reorient the position of the conveyed muffler during transit thereby assuring proper disposition for introduction to the following stage, as briefly described above.

The terminal stage of the system is composed of a conveyor 900. The conveyor conveniently transports the capped unit to a seamer 32 for seaming the end caps to the outer body of the muffler as will be discussed below. For the present it is noted that the seamer is a product of Moon Brothers Ltd. and sold under the trade name "Model 2S." Further reference may be had to the Moon brochure entitled "Semiautomatic double seaming machine, Models 2SZ, 3SZ, 4SZ."

The drive system may now briefly be considered. Generally each of the aforementioned components have their own motion drives which are in operation when the line is in operation. The operation of the entire line and of the individual motors is controlled by a series of limit switches or equivalent structures that sense the progress of operation and are responsive to the presence or lack of presence of required components for fabrication at the various operative stations. The entire line is primarily controlled by signals from the wrapper-seamer unit 400 with secondary control including signals form each of the other units indicating that the parts are properly positioned. Thus, the system is a sequential system whereby operation is dependent upon a plurality of signals.

FIGS. 2, 4, 26 and 27 may now be considered. These figures generally show the feeding and shearing operation whereby sections of material may be obtained from a length of sheet stock.

The sheet material 12 is shown as being fed from the coil in the direction of arrow 33. Motion is imparted by the feeding apparatus 16 in response to system demand and a length of sheet stock.

The sheet material 12 is shown as being fed from the coil in the direction of arrow 33. Motion is imparted by the feeding apparatus 16 in response to system demand and the clutch engagement of a gear train and a constantly driven motor. In this manner the sheet material is passed over a "hump table" 100.

The table is supported by a group of spaced upstanding legs 102 each carrying feet supports 104 at one end. A pair of side braces 106 are mounted to the other leg ends along opposed sides for stabilization of the table. Additional braces 108 provide further support. A plurality of brackets 110 are mounted for movement on the side braces. The brackets 110 are provided impairs thereby to support each of the shafts 112, 114 and 116. Two additional shafts 118 span the side braces themselves. These latter shafts are disposed at the downstream and upstream ends of the table. Each of the aforementioned shafts carry a pair of spaced wheels 120 (FIGS. 4 and 27). As shown the wheel pairs from shaft to shaft are positioned at differing distances from the shaft ends to provide support for the sheet material 12. Thus, the end and middle wheel pairs are disposed in greater spaced relation than are the remaining wheel pairs. Each wheel is mounted in fixed position on the respective shaft by the hubs 122. Generally the wheels are keyed to the shaft thereby to move therewith and in this connection the shafts may be suitably journaled by the brackets 110. As is apparent the several wheels serve to transport the sheet material to the press 18.

The table also provides a plurality of spaced guides 124. These guides are supported by a pair shafts 125 which are, in turn, carried by brackets 126 and 128 at each end. The brackets are mounted on the braces 106. Structure, generally identified by the numeral 130 and not clearly shown suitably intercooperates with the bracket 128 for adjustment thereby to adjust the disposition of the guides about a pivot point defined by shaft 125. By additional structure (also not shown) each of the center brackets 110 are adjustable both up and down (in relation to feet 104) to vary the disposition of the wheel pairs carried by the respective adjustable shafts. In this manner more or less of a "hump" may be introduced in the path for the sheet material, i.e., over the several rollers and between the rollers and guides. Since the degree of bend in the sheet may vary as the material is fed from the coil it may be necessary to adjust the feed path thereby to apply varying degrees of reverse bend and substantially overcome the tendency of the sheet and cut sections to bow.

Once the sheet is cut into sections of predetermined length within the press and embossed, as desired, and the sections exit the same they are transported to a further station by the transport table 20 including conveyor 22. Drive for the sheet and sections is supplied by the feeder 16. The conveyor 22, however, has its own drive which is constantly operative.

The transport table is supported by a frame, such as the "-hump table" frame unit. In this connection the frame includes a plurality of upstanding legs and horizontal braces thereby to provide the necessary stability. The conveyor 22 is defined by a plurality of parallel shafts 34 which may support and drive an endless belt, as is conventional. Driving input may be through one of the shafts by a pulley arrangement from a drive motor (not shown).

The magnetic arm 24 is supported by the table for pivotal movement about an axis at 25 and through an angle of 90°. Movement of the arm is intermittently controlled and responsive to system demand originating with the wrapper-seamer unit. Upon demand, the arm 24 "hooks" a section and conveys the same over the table surface and onto the spaced rollers forming tracks 38. These rollers may be freely movable and function to support the sheet above the table as the arm moves the section into a second operative phase of the system. This phase is best seen in FIGS. 3, 4 and 23–25.

Included within this phase is the flanger 26, best seen in FIG. 4. The flanger includes a housing 41 providing an entrance and an exit for the sections conveyed thereto. The housing supports therein a plurality of constantly driven shafts 40 and roller pairs 42. The shafts are disposed in parallel relation and the individual rollers are adjustable between the ends of their support shafts. Adjustment is provided thereby to accept sections of varied width. Means are provided for flanging the opposed uncut sides of the sections during movement through the unit. This is not clearly shown in the Figure and therefore for the sake of discussion the means may be in the form of cam surfaces adjacent the walls 44 which force the sides of the section from the plane of the intermediate portion. This type of operation is generally conventional in the art. However, as previously discussed, the operation of the flanger 26 may be more fully appreciated through reference to the Moon brochure.

Referring now to FIGS. 23–25, there is illustrated a further conveyor disposed at the exit of the flanger 26 for transport of the flanged sections toward the input table of the wrapper-seamer unit 400.

The conveyor is supported by a frame 202, such as the frame heretofore described for the "hump table" 100. In this connection the frame includes a plurality of upstanding legs and horizontal members interconnecting the legs for support. The frame carries spaced bracket pairs 204 and 206 at each end of the upper horizontal members. The brackets, in turn, mount a pair of rotatable shafts 207 each supporting a plurality of spaced wheels 208. The wheels support for movement a plurality of spaced endless belts 210 for drivingly moving the flanged section along a downward incline. The section is guided during movement by the spaced guide walls 222 which extend the length of the conveyor. The leading ends of the walls, at 224, are outwardly flared thereby to receive for passage sections that may be positions of misalignment.

The conveyor 200 is driven by the drive motor for the flanger unit 26. The drive, only generally shown in FIGS. 23 and 24, includes a drive wheel 212 and a driven wheel 214 connected by a pulley 215. Through a gear train (not shown) motion is imparted to wheel 216 for frictional drive of the several belts 210 supported by wheels 208, 216 and 218. Tension adjustment of the several belts is provided through adjustment means 220. In this connection the wheels 218 may be displaced within a plane generally parallel to the upper conveyor run to either increase or decrease tension, as desired, thereby to transport the section 19 to the table 28. While not shown in the drawing figures the section 19 at the table receives an asbestos section which serves as a liner between the outer wrap of the muffler and the inner core. The asbestos sections are automatically fed to the table 28 by means (not shown).

The transport table is part of the wrapper-seamer and will be discussed below. The immediately following discussion with reference specifically to FIGS. 18–20 is directed to a conveyor apparatus for conveying the several muffler cores to the table of the wrapper-seamer for entry into the same with the lined sections 19.

The conveyor 300 is carried by the supporting frame 302 and includes an elongated conveyor path for the inner core toward the table 28. Within this path each muffler inner core 30 supported on end for movement in the direction of the arrow (see FIG. 1) is tipped thereby to be disposed on its generally flat side. Thereafter the core is turned through 90° so as to arrive in proper disposition at the table 28 for transport into the wrapper-seamer, i.e., with its major axis perpendicular to the ground.

The muffler, in the upstanding position, is directed to and supported between a pair of members 304 and 306 generally bounding the elongated sides of the muffler. A pair of opposed plates 308 are pivotally mounted to a shaft 310 and connected to the individual members 304 and 306. Through movement of a rod 312 responsive to the air cylinder 314 the plate 308 directly connected to the rod is caused to pivot and deliver one at a time an inner core to the conveyor. In this connection the inner core falls to the left in FIG. 18 and is conveyed on a driven conveyor belt 316 supported by a plurality of wheels 318. Drive for the belt is supplied by the drive motor 320 carried by one of the frame members 302.

The inner core is conveyed substantially the entire length of the conveyor on one elongated side as shown in FIG. 20. However, immediately prior to the table 28 the muffler is moved onto a laterally spaced portion of the conveyor thereby being located in the depressed region 321 surrounded by a plurality of roller bearings 322 to aid in sliding side movement. Suitable means are then provided to move the muffler on to the table 28 in conjunction with a lined section 19.

The wrapper-seamer 400 and the table 28 may best be seen in each of FIGS. 5, 5A, 7 and 7A.

The wrapper seamer, as has been briefly discussed, serves as the primary control unit of the fabrication system. Therefore, when an inner core 30 from the conveyor 300 as well as a lined section 19 is present at the table 28 and a then occurring wrapping and seaming operation is completed, with the unit then being passed to the accumulator conveyor 600 for further processing, the new components for assembly enter the same. This movement signals operation of all equipment so as to cut further sections from stock, flange a cut section, etc. The conveying to and from the wrapper-seamer and the operation of the unit will now be discussed.

The table 28 and the wrapper-seamer are carried by a frame unit 404 of a construction as hereinbefore described. The table includes a channel 402 supporting a reciprocable member 406 and is converted by a grill network 405 to provide a surface for each lined section and also allow the arm to project from the channel and move therealong.

The member 406 includes a magnetic bar 410 and an arm 412 carrying a pair of arbors (not shown). The bar is mounted by a base 414 including a roller 416 movable in a track 418.

Upon movement of the member an individual lined section 19 and an inner core 30 is delivered to the wrapper-seamer 400. The unit provides structure (not shown) to positively retain the inner core in position whereas the lined section is disposed above a ram 408 and immediately beneath the core. The ram is hydraulically controlled by unit 48 (see FIG. 1) and when the components are properly aligned moves upwardly as viewed in FIG. 5 thereby to force the liner partially around the inner core. Wrapping is aided by the inherent tendency of the section to bow in the direction of ram travel.

Once the core is partially wrapped, there being an opening at the top in the region of the side flanges, the knives 420, 422 and 423, supported for reciprocation sequentially, operate on the flanges to not only enclose the core but to also form a lock seam.

The muffler the following stages of the operation are shown in FIGS. 21 and 22.

In these figures the wrapped and seamed muffler, represented by the numeral 50, carries its lock seam 52 in a generally upstanding position. A double pair of rollers, generally indicated by the numeral 430 serves to bend the seam from the FIG. 21 position to the FIG. 22 for further processing.

In this connection a support 432 carries a first pair of rollers 434 and 436 which are individually mounted for rotation by means of bearings 438 on shafts 440 and 442. The roller peripheries are suitably cut and/or contoured to both cooperate with each other and the lock seam to partially bend the seam toward the muffler body.

An additional roller 444 is also mounted on the support 432. The roller is similarly mounted for rotation and is provided with a channelled groove thereby to roll over the seam, while surrounding the same, and press it upon the muffler body.

A magnetic pickup 460 thereafter reciprocates toward the muffler 50, secures the same for movement and deposits the muffler in the chute 462 communicating with the accumulator conveyor 600.

The accumulator conveyor 600 may best be seen in FIGS. 13–15. The conveyor is in the form of a tower formed by pairs of generally inclined legs 602 and 604 integrally or otherwise connected at the top in a trapezoidal arrangement. The bottom positions of the legs are supported on a stand 606 including legs 608 thereby to elevate the frame in relation to the ground. Spaced along the length of the legs are a plurality of horizontal braces 610 to provide necessary support for the structure.

The conveyor includes a plurality of gear wheels 612 and 614 carried at the base of tower and gear wheels 616 carried at the top of the tower in a triangular disposition. In the figures each plurality includes four gear wheels thereby to drive a like number of conveyor chains 618. Any particular number of conveyor chains, as desired, may be employed for proper support of the mufflers to be carried from stage to stage.

Opposed bracket plates 620 are mounted by each of the frame legs, the stand and horizontal braces whereas a bracket plate pair 622 is carried within the upper trapezoidal region of the frame. Each bracket pair 620 supports therebetween a shaft 624 while the bracket pair 622 supports therebetween the shaft 626. Each shaft is journaled for rotation and each shaft, by means of the hubs 628 keyed thereto, stationarily supports the several gear wheels for intermittent movement in response to system operation. During motion is imparted to the conveyor through an air-powered ratchet arrangement as clearly illustrated in FIGS. 16 and 17.

As shown it, for example, FIG. 5 the accumulator conveyor is disposed at the output of the wrapper-seamer thereby to receive for transport mufflers 50 in a stage of partial completion. In this connection the mufflers exiting the chute 462 are received in individual pockets formed by rest bars 630 carried by the conveyor chains. Thus, in all, each muffler is supported during movement by four rest bars spanning the width of the tower as illustrated in FIG. 14.

In operation, the muffler received by the first accumulator conveyor is disposed with the seam 52 directed away from the longitudinal axis of the tower. However, the muffler must be reoriented prior to receipt by the end flanger 700 for proper operation. Therefore, an important feature of the invention is the structure for reorienting the muffler during transit between stages. This structure is shown in FIG. 15.

The reorienting structure is composed of a paddle 634 which is mounted by the shaft 66 between the center gear wheels so as to project into the path of movement of a muffler as it moves clockwise as in FIG. 15. The paddle is pivotally mounted by an arm 636 which, in turn, is mounted on the shaft 626. The paddle and the arm carry projections 638 and 640, respectively, and an adjustment member 642 is mounted on each projection. By adjustment of the member 642 the disposition of the paddle in relation to the arm may be affected. Similarly, by adjustment of a second member 644 the disposition of the arm in relation to the tower legs may be affected. In short by proper adjustment of both the members 642 and 644 proper movement of the muffler may be obtained as the chain conveyor moves during stepped drive.

In FIG. 15 the muffler is shown in the reoriented position. In this connection the muffler upon delivery to the conveyor was disposed with the seam 52 (shown by the bead at the base of the muffler) in the outward direction. However, during movement and through the intercooperation of the paddle 634 and upon movement of the rest bars 630 the muffler pivots about the paddle end into the seam inward direction.

The drive for the accumulator conveyor may best be seen in FIGS. 16 and 17.

The drive is provided by an air powered ratchet for direct drive of the shaft 624 and gear wheels 612. In this connection an air cylinder 650 including a piston rod 652 is pivotally mounted on a vertical support member 654 carried between horizontal support members 606 and 610 (see FIG. 13). The rod at the other end, is pivotally mounted on the arm 656 for movement of the arm about the shaft 624. The arm 656 upon reciprocation of the piston rod moves the member 657 with the arm. The member is connected to the ratchet 660 and the gear wheel 612 by a heavy spring 658 which causes the ratchet to follow arm movement to a stop determined by the rotational position of the member 657.

The accumulator conveyor provides a chute 702 including a plurality of bottom support elements appropriately spaced to allow passage of the rest bars 630. In this manner the muffler so will, during movement, follow the chute and move toward the next stage of the system.

The end flanger 700 is carried by a frame generally indicated by the numeral 704 which is of elongated construction in the direction lateral to the flow path of the several mufflers. The frame in the center portion mounts a plurality of wheels 706 in a generally rectangular array. Each wheel is keyed to and supported by a shaft 708 which is journaled for rotation in a pair of spaced support members 710. The wheels support for movement an endless conveyor belt 712 which is driven through a gear train (not shown) connecting one wheel to the constantly driven motor 714. The drive train may include a clutch or other similar structure thereby to provide conveyor motion on demand.

A plurality of elongated U-shaped elements 716 are carried by the conveyor and spaced uniformly around the total conveyor belt. The elements function to support the muffler for movement to and through the operative stage of the unit and to an output whereat the muffler is deposited by the element into a chute 718 leading to a pocket formed by a rest bar in the next accumulator conveyor (FIG. 6).

As should be apparent all units must operate in synchronism with one another thereby to assure that, for example, the muffler exiting the wrapper-seamer chute 462 will be received in a pocket of the accumulator and similarly that the muffler conveyed by the accumulator will be received by an element 716 on the flanger conveyor 712.

The muffler 50 is conveyed to the center of the unit by the belt 712 and by means (not shown) is upwardly removed from the element 716. A plurality of member 720 are mounted in quadrature around the repositioned muffler. The members include a movable element having a surface generally complementary to the configuration of a portion of the muffler. These elements positively grip the muffler during the end flanging operation.

The lateral portions of the unit 730 and 732 each carry a pair of movable heads (not clearly shown). The heads are generally arcuate in front configuration and upon movement toward the gripped muffler, and simultaneously at both sides of the muffler, outwardly flange a short length of the end portions to an angle of approximately 90°.

After the flanging operation the heads retract, the clutching elements withdraw into the member 720, the muffler returns to the U-shape element 716 thereupon to be conveyed from the flanger and into a second accumulator conveyor which is similar to the conveyor described above.

A chute 802 similar to the chute 702 carries the muffler to the next stage of the system wherein a pair of end caps are received over the flanged muffler ends. This unit is shown in FIG. 6.

The muffler 50 is received by a feed bar 804 and moved into operative position within the unit. Disposition of the muffler is along the axis of a rest 806 which is capable of reciprocating to positions of elevation in response to movement of an air-powered ram 808. Therefore, in operation the muffler is moved from the plane of the feed bar to a position generally on the axes of two cylindrical heads 810 and 812. Each head is mounted by a holding chuck and is movable to and fro within a passage generally bounded by the supporting structure 814.

A pair of magazines 816 are positioned within the path of movement of the head 810 and 812 and each magazine is supplied with a plurality of end cap members (not shown). Feed of caps to the passage as well as movement of the heads is controlled by the operation of the wrapper-seamer and responsive to proper positioning of the muffle in the elevated position.

The inner core of the muffler 50 is provided with both an inlet and an outlet conduit. These conduits may be arranged in various positions in the end faces. Therefore, it is necessary to properly align the end caps on the muffler and in relation to these conduits. For this purpose there is provided a pair of alignment pins 822 to assure a proper orientation of the cap in relation to the muffler and inner core prior to frictional receipt of the same.

Feed bar 805, upon retraction of the rest 806 moves the capped muffler from the unit and deposits it on the conveyor 900 for movement to a seamer 32 which seams the caps to the body.

The conveyor is supported by a frame member 902 and includes a plurality of driven endless belts 904 entrained around a plurality of wheels 906 supported on the shafts 908.

The conveyor 900 is substantially similar in construction to the conveyor 200 heretofore described and further description is considered unnecessary.

However, the conveyor includes at its raised end a terminal unit 920 with a general downwardly directed upper surface terminating in an arcuate end wall 912. Such constructions are conventional and mufflers may be accumulated thereon prior to removal for any final processing, as in the seamer 32. While FIG. 1 illustrates the seaming operation of seamer 32 to be carried out in a unit removed from the line and total line processing, it is contemplated that this stage may be incorporated directly in the line to provide automatic seaming of the muffler ends. Thus, for example, necessary seaming of the end caps to the muffler body may be accomplished immediately following the capping of the muffler in the capping unit 800. In this connection, the muffler will be conveyed to the seamer by a conveyor such as described above.

A further possible alternative of the conveyor line may be seen in FIG. 1A. In this connection, the processing line as shown in the figure functions in a manner whereby individual sections 19 from stored stock may be introduced automatically (by means not shown) on the table 20. Whereas, the process as shown and described with regard to FIG. 1 includes the various steps within which the blanks are cut from sheet material, operated upon to introduce a reverse bending in the sheet to overcome any tendency to return to the coil configuration and transport it to the table 20, these steps have been eliminated in the present figure. All operative functions which are carried out in the process as shown in FIG. 1, are thereafter carried out in the process as shown in FIG. 1A.

Having described the invention with particular reference to the preferred form thereof, it will be obvious to those skilled in the art to which the invention pertains, after understanding the invention, that various changes and modifications may be made therein without departing from the spirit and scope of the invention, as defined by the claims appended hereto.

What is claimed as new and desired to be secured by Letters Patent is:

1. In a system for the automatic fabrication of automotive mufflers from a blank of sheet material having predetermined dimensional characteristics, the combination comprising motive means for transporting said blank through said system including a wrapper and seamer unit for wrapping said blank around an hereinafter defined inner core and seaming the joined longitudinal edges of said blank to enclose said inner core forming a tubular member, a flanger unit for forming a flange around the periphery at the open ends of the member for receipt of a pair of end caps, and a seamer unit for securing said end caps at said open ends to enclosed said inner core; and second motive means responsive to movement of said first motive means for transporting said inner core in synchronism with the movement of said blank thereby to orient said inner core in relation to said blank to travel in consort therewith whereby said inner core in enwrapped in said blank and secured by said end caps within the aforementioned units.

2. The system of claim 1 further including reeling apparatus for carrying a coiled reel of sheet material, means for feeding said material and cutting means for cutting said blank of predetermined dimension characteristics from said sheet.

3. The system of claim 1 further including flanger means for forming longitudinal flanges along opposed sides of said blank prior to transporting said blank to said wrapper and seamer unit.

4. The system of claim 1 wherein said second motive means includes conveyor means including a first path for moving said inner cores disposed in an upstanding position, a second path, means between said first and second paths for supporting said upstanding inner cores and for moving said inner cores onto said second path, and means within said second path for moving said core to a third path.

5. The system of claim 1 wherein said wrapper and seamer unit includes a ram movable generally along the axis of said unit, means to move and stationarily dispose said inner core into said path of movement, means to move said blank into said path of movement and between the inner core and said ram whereby movement of said ram wraps said blank partially around said inner core.

6. The system of claim 5 including a plurality of sequentially operable members, said members disposed adjacent the unwrapped portion of said inner core and operable to fully enwrap said core and form a longitudinal seam.

7. The system of claim 6 including means to bend said seam onto said enclosing wrap.

8. The system of claim 1 wherein said first motive means includes a conveyor connecting said wrapper and seamer unit and said flanger unit, and means for increasing the path of travel of said tubular member between said units.

9. The system of claim 8 comprising means for reorienting the disposition of said tubular member during transit along said increased path, said means including an element mounted to project into said conveyor path thereby to cause said tubular member to pivot about said element end.

10. The system of claim 1 wherein said flanger unit comprises a housing, a pair of elements supported for reciprocable movement within the housing along a common axis, means for supporting said tubular member within said housing in a manner such that its longitudinal axis is substantially coincident with said common axis thereby to be in position for receiving said peripheral flange, means to move said tubular body into said housing and into said position, and means for moving said movable elements against said tubular body to form said flange.

11. In a system for the automatic fabrication of a tubular member from a blank of sheet material having predetermined dimensional characteristics for providing an outer wrap, the combination comprising motive means for transporting said blank through said system including a wrapper and seamer unit for wrapping said blank around an hereinafter defined inner element and seaming the joined longitudinal edges of said blank to enclose said inner element thereby forming a tubular member, a flanger unit for forming a flange around the periphery at the open ends of the tubular member for receipt of a pair of end caps, and a seamer unit for securing said end caps at said open ends to enclose said inner element; and second motive means responsive to movement of said first motive means for transporting said inner element in synchronism with the movement of said blank thereby to orient said inner element in relation to said blank to travel in consort therewith whereby said inner element is enwrapped in said blank and secured by said end caps within the aforementioned units.

* * * * *